United States Patent [19]

Herndon et al.

[11] Patent Number: 5,151,225
[45] Date of Patent: Sep. 29, 1992

[54] FLAME RETARDANT COMPOSITION AND METHOD FOR TREATING WOOD

[75] Inventors: James F. Herndon, Thomson, Ga.; Dennis J. Morgan, Springfield, Oreg.

[73] Assignee: Hoover Treated Wood Products, Inc., Thomson, Ga.

[21] Appl. No.: 588,278

[22] Filed: Sep. 26, 1990

Related U.S. Application Data

[63] Continuation-in-part of Ser. No. 345,969, May 1, 1989, abandoned.

[51] Int. Cl.$^5$ .................................................. C09K 21/00
[52] U.S. Cl. ....................................... 252/607; 252/603; 106/18.13; 106/18.21; 427/233
[58] Field of Search .............................. 252/603, 607; 106/15.05, 18.13, 18.15, 18.16, 18.14, 18.21; 427/223

[56] References Cited

U.S. PATENT DOCUMENTS

| | | | |
|---|---|---|---|
| 3,874,990 | 4/1975 | Surdyk | 161/261 |
| 3,986,881 | 10/1976 | Oberley | 106/15 FP |
| 4,076,540 | 2/1978 | Stossel | 106/15 FP |
| 4,152,320 | 5/1979 | Shapiro et al. | 260/45.85 T |
| 4,174,223 | 11/1979 | Steen | 106/18.16 |
| 4,784,918 | 11/1988 | Klett et al. | 428/447 |
| 4,806,620 | 2/1989 | Klett et al. | 528/244 |

Primary Examiner—Richard D. Lovering
Assistant Examiner—N. Bhat
Attorney, Agent, or Firm—Harness, Dickey & Pierce

[57] ABSTRACT

A flame retardant composition and associated method for treating wood and other cellulosic materials is disclosed. The composition, in its preferred embodiment, represents and aqueous solution containing a water soluble amide; an oxy-acid of phosphorous; a metal salt of boron; an oxy-acid of boron and sodium hydroxide and has a pH of about 4.75 to about 5.25.

27 Claims, No Drawings

FLAME RETARDANT COMPOSITION AND METHOD FOR TREATING WOOD

CROSS-REFERENCE TO RELATED APPLICATION

This is a continuation-in-part of U.S. application Ser. No. 345,969, now abandoned, filed May 1, 1989, and expressly incorporated herein by reference.

BACKGROUND AND SUMMARY OF THE INVENTION

This invention relates to wood treatment compositions and associated methods for imparting fire retardance to wood and other cellulosic materials. More particularly, these compositions are aqueous solutions of a water soluble amide (such as urea); an oxy-acid of phosphorus (such as phosphoric acid); a metal salt of boron (such as borax); an oxy-acid of boron (such as boric acid); and a caustic material to control pH to a level of about 4.75 to about 5.25 (such as sodium hydroxide).

In recent times, more and more interest has focused upon flame retardant treatments for wood. Flame retardant treated wood is sued in a variety of ways so as to afford a greater safety to occupants of structures containing such treated wood and to consumers of wood products. Essentially, flame retardant treatments for wood and cellulosic materials fall into generally two broad categories: (1) those compositions and treatments that allow wood and cellulosic materials so treated to maintain fire performance characteristic after exposure to weather or water; and (2) those compositions and treatments that are not designed to allow wood and cellulosic materials so treated to maintain imparted fire performance or other desirable characteristics after exposure to weather or relative humidities above approximately 95%. Generally the second category of compositions are labeled as "interior use" types and represent the predominate types of wood and cellulosic treatments in today's market. These treatments are usually less expensive than treatments within the first category which are labeled as "exterior use" types.

Illustrative of various past approaches of imparting "exterior use" types of fire retardance to wood are treatment compositions disclosed in Goldstein et al., U.S. Pat. No. 2,917,408, prepared from a combination of an amide, dicyandiamide and phosphoric acid; and Goldstein et al., U.S. Pat. No. 3,159,503, prepared from a combination of dicyandiamide, phosphoric acid and formaldehyde. In Juneja, U.S. Pat. No. 3,887,511, fire retardant compositions are disclosed comprising a partially reacted mixture of urea, dicyandiamide, formaldehyde and phosphoric acid. Surdyk, U.S. Pat. No. 3,874,990, discloses a fire retardant composition comprising a combination of alkaline borate chemicals: phosphoric acid, malamine or urea and formaldehyde. Finally, Loyvet et al., U.S. Pat. No. 4,461,720 discloses a fire retardant composition prepared by first converting dicyandiamide to an aqueous guanyl urea solution. The guanyl urea solution is then methyolated and phosphoric acid is introduced in order to product a phosphate salt of the methyolated guanyl urea.

Disadvantages associated with these aforementioned pas formulations were primarily due to their use of formaldehyde, phosphoric acid and/or urea, and their ultimate pH. For example, formaldehyde may not be environmentally acceptable in some instances and phosphoric acid and urea are both known to be relatively corrosive and hygroscopic when employed in art-disclosed compositions at their art-disclosed pH ranges. The cost of the treated wood produced using these compositions is also relatively expensive.

Illustrative of various past practices for the creation of "interior use" treatment solutions are the compositions disclosed by Oberley in U.S. Pat. No. 4,373,010, in which dicyandiamide, phosphoric acid and boric acid were combined to produce a fire retardant composition. Another "interior use" type of composition, known to those with knowledge of the art, usually contains di-ammonium or mono-ammonium phosphate in combination with ammonium sulfate and zinc chloride.

Objects of the present invention include, without limitation, a fire retardant composition for wood which is generally environmentally acceptable; relatively low in toxicity; relatively non-corrosive and non-hygroscopic; which may be stored for relatively long periods of time; and which minimizes the degradation of the wood substrata or adjacent surfaces when subjected to abnormally high temperatures and high humidities.

These objects are accomplished by the use of a fire retardant composition containing an amide, an oxy-acid of phosphorus, a metal salt of boron, an oxy-acid of boron and sodium hydroxide, while employing a pH range of about 4.75 to 5.25.

In accordance with the present invention various preferred operative ranges associated with the components of the composition have been determined. It has been found that the amount of the amide contained within the composition of this invention may vary between about 10% to about 40%, by weight, of the total weight of the final treatment composition. Typically, it is preferred that about 28% to about 38% of the total weight of the composition is formed with an amide, with the preferred embodiment having a composition of about 33%. It has further been found that the amount of the oxy-acid of phosphorus contained within the composition of this invention may vary between about 15% to about 50% (by weight) of the total composition weight. It is preferred that the oxy-acid of phosphorus represent between about 22% to 32% of the composition, with the preferred embodiment having a composition of about 27%. Further, it has been found that the composition may contain an amount varying between about 1% to about 50% of the total composition weight, of an oxy-acid of boron and a metal salt of boron. It is preferred that the composition contain between about 10.5% and 20.5% of an oxy-acid of boron and between about 10.5% and 20.5% of a metal salt of boron, with the preferred embodiment having 15.5% of each of the boron compounds. Additionally, sodium hydroxide is contained within the composition in varying amounts of between 6.5% and 10.5% of the total composition weight. Ideally, the preferred amount of sodium hydroxide will be about 8.5% of the total composition weight.

These and other objects and advantages are attained by the invention and will become more fully apparent from the following description, taken in conjunction with specific examples included for the purpose of illustration only. In the appended specification and claims all percentages are percentages by weight unless otherwise stated.

DETAILED DESCRIPTION OF THE PREFERRED EMBODIMENT

According to the present invention there is provided a flame retardant composition for the flame retardant treatment of wood and other cellulosic material. The flame retardant composition of the present invention includes an amide; an oxy-acid of phosphorus; an oxy-acid of boron; a metal salt of boron; sodium hydroxide; and has a pH of about 4.75 to about 5.25.

Urea is preferably used, by this invention, as a source of nitrogen. Urea is a very stable derivative of carbonic acid and its use allows the composition, made in accordance with the teachings of the preferred embodiment of this invention, to be stored for long periods of time. Other suitable nitrogen source compounds such as biuret may be used in this invention. However, while useful, many of these other compounds are far more reactive than urea and compositions prepared therefrom may not exhibit the beneficial long storage life characteristics of urea-employing compositions. Normally wood treated with urea is both corrosive and hygroscopic. Therefore other compounds, as disclosed herein, must be added to the composition of the preferred embodiment of this invention to offset these characteristics. Typically about 10% to about 40% of the composition of this invention may be of urea. However, it is preferred that about 28% to about 38% of the composition is formed with urea wherein the preferred embodiment has a composition of about 33%

Oxy-acids of phosphorus are used by the composition of this invention as a source of phosphates which may be themselves be used to impart fire retardant characteristics to the wood. Solutions containing only oxy-acids of phosphorus are however both corrosive and hygroscopic. Further, wood treated with such compositions may suffer rapid strength loss and degradation when subjected to high heat and humidity. Oxy-acids used in the composition of this invention includes such forms as $H_3PO_4$, $HPO_3$, polyphosphoric acids, and mixtures of two or more of these materials. Typically, the composition of the preferred embodiment of this invention may contain approximately about 15% to about 50% of oxy-acids of phosphorus. It is preferred, however, that the flame retardant composition of this invention contain about 22% to about 32% of phosphoric acid with the preferred embodiment having a composition of about 27% phosphoric acid.

A metal salt of boron (such as sodium tetraborate or borax) is used in conjunction with an oxy-acid of boron (such as boric acid) in the composition of the preferred embodiment of this invention.

These aforementioned boron compounds generally act as buffers to assist in maintaining the pH of the composition; to retard the production of ammonia and/or ammonia compounds from the amides; to act as catalysts for the production of higher order amides in the composition; and as glow inhibitors and smoke inhibitors in the composition. The use of a metal salt boron with an acid of boron increases the solubility of both compounds above that which each would have individually, thereby increasing the amount of metal salts of boron that may be added to the composition. Typically, the composition of this invention may contain from about 1% to about 55% of boron compounds. It is preferred however that the flame retardant composition of this invention contain about 10.5% to about 20.5% of each of the boron compounds, with a preferred embodiment having about 15.5% of each of the boron compounds.

A caustic soda such as sodium hydroxide is used to further reduce the corrosive effects of the oxy-acids of phosphorus by maintaining a pH in the approximate range of between 4.75 and 5.25 for the overall composition. Typically the composition will contain between about 6% and about 10% of a caustic material, such as sodium hydroxide, with the preferred embodiment containing about 8%. It will be appreciated by the skilled artisan that the amount of caustic of NaOH employed will depend upon the beginning pH of the precurser composition, i.e., prior to the addition of NaOH, which is typically (but not necessarily) added last, to obtain the desired pH range.

The composition, made in accordance with the teaching of the preferred embodiment of the present invention, provides fire retardancy while minimizing degradation and weakening of the wood to which it is applied when such treated wood is subjected to high heat and humidity. The wood treated with this composition is relatively non-corrosive and non-hygroscopic and has pH value that is lower than approximately 5.25. The non-corrosive and non-hygroscopic character is provided by the interaction between the water soluble amide; the oxy-acid of phosphorus; the aforementioned boron compounds and sodium hydroxide which provides the requisite pH. The aforementioned corrosive and hygroscopic natures of the urea and the oxy-acid of phosphorus, used within the composition of the preferred embodiment of this invention are not generally exhibited when the pH of the composition is maintained below 5.25 and above about 4.75.

This pH range is additionally important as it has been found that an undesired residue appears shortly after applying the composition to wood products when the pH of the composition is lower than 4.75. Also, maximum flame retardation occurs when the pH of the composition is lower than 5.25. It is therefore preferable to have a composition with a pH within the approximate range of 4.75 and 5.25.

In a preferred embodiment, the composition and methods of the present invention are substantially free of formaldehyde or its close derivatives, as they are unnecessary to the compositions of the present invention. By "substantially free of formaldehyde" as employed herein, is meant that the final treatment composition contains less than about 5%, more preferably less than about 3%, and still more preferably less than about 2% formaldehyde by weight. In a highly preferred embodiment, it contains less than any detectable amount of formaldehyde.

The composition of the preferred embodiment of this invention may be made, at room temperature, by first placing approximately 200 grams of water in a container and adding approximately 110 grams of urea while agitating the water. The water and urea solution is then cooled such that its temperature does not rise above approximately 33° centigrade and approximately 90 grams of phosphoric acid is then added. The solution is then transferred to an approximately 2,000 milliliter flask and approximately 1,717 grams of water are added and mixed therewith. Approximately 51.5 grams of boric acid and approximately 51.5 grams of borax are then added with concurrent agitation to the flask wherein said agitation is contained for about 30 minutes until the borax and boric acid are dissolved therein.

NaOH is added last to adjust the pH to about 4.75 to about 5.25.

The composition of this invention may be applied to wood and other cellulosic materials by a variety of standard treatment processes well known in the art such as pressure treatment (which is the preferred method), spray, dip, diffusion or brush. This composition may also be used with a variety of treatment processes such as a vacuum, full cell, empty cell, modified full cell; modified empty cell; or other appropriate treatment process. Furthermore, since the composition made in accordance with the teachings of this invention is very shelf stable when compared to art—disclosed compositions employing similar materials or components, it may be stored for long periods of time. The composition may be shipped as a concentrate or in individual components. It will be appreciated that, while the molar ratios of the materials will generally remain constant, the ranges of the necessary components may vary in a concentrate solution as it will be later diluted to the preferred ranges described herein. Lastly, the composition of this invention may also be applied to wood and then the wood may be finished with various commonly used finishes.

Numerous experiments have been performed which demonstrate the effectiveness of this invention. The following examples illustrate of the invention but should not be construed to limit the same.

EXAMPLE 1

Several compositions were prepared in a number of vessels at room temperature. The composition of each mixture is shown in Table 1. Each mixture was diluted with water such that the percentage of solids attributable to each solution was adjusted to approximately 15%. These solutions are denoted as solutions 1-5.

TABLE 1

|  | Urea grams | Phosphoric Acid grams |
|---|---|---|
| Solution 1 | 500 | 0 |
| Solution 2 | 375 | 125 |
| Solution 3 | 250 | 250 |
| Solution 4 | 125 | 375 |
| Solution 5 | 0 | 500 |

An approximately 13.5% aqueous treating solution containing urea, dicyanidiamide, and phosphoric acid in an approximate ratio of urea to dicyandiamide of about 15% to about 85%; and an approximate ratio of the urea and dicyandiamide mixture to phosphoric acid of about 55% to about 45% was then prepared. The solution was prepared from approximately 57.4 grams of dicyandiamide; 10.2 grams of urea; 55.3 grams of phosphoric acid; and 787.5 grams of water.

To prepare the solution, water was placed within a container and then agitated while dicyandiamide was added. The phosphoric acid was subsequently added. The resulting mixture was heated to approximately 85° centigrade and held at that temperature for approximately 45 minutes. The mixture was then cooled to approximately 25° centigrade and urea was then added. The resultant solution is hereinafter denoted as solution 6 and produced guanyl urea phosphate and urea.

An approximately 13.5% aqueous treating solution containing urea and phosphoric acid in an approximate ratio of urea to phosphoric acid of about 55% to about 45% was next created. The solution was prepared from about 110 grams of urea; about 90 grams of phosphoric acid; and about 200 grams of water. The solution was prepared by first placing water in a container and then agitating the water while adding urea. The phosphoric acid was later added while the water and urea solution was cooled so as to prevent the temperature from rising above approximately 33° centigrade. The resultant solution produced an anhydrous product containing urea phosphate and is hereinafter denoted as solution 8.

An approximately 7.5% aqueous treating solution containing approximately 45% of the anhydrous product of solution 8 and approximately 55% of boric acid was prepared from approximately 400 grams of solution 8; approximately 244 grams of boric acid; and approximately 5,276 grams water. This solution was prepared by first mixing solution 8 with water in an approximately 8,000 milliliter flask. The boric acid was added with general concurrent agitation to the flask. Agitation was continued for approximately 30 minutes until the boric acid was dissolved thereby forming a solution hereinafter denoted as solution 9.

An approximately 7.5% aqueous treating solution containing approximately 45% of the anhydrous product of the solution 8 and approximately 55% of borax was next prepared. The solution contained approximately 400 grams of solution 8; approximately 244 grams of borax; and approximately 5,276 grams of water. This solution was prepared by first mixing solution 8 and water together in an approximately 2,000 milliliter flask. The sodium tetra borate was later added with concurrent agitation to the flask. Agitation was continued for approximately 30 minutes until the sodium tetra borate was dissolved thereby forming a solution hereinafter denoted as solution 10.

An approximately 15% aqueous treating solution containing approximately 45% of the anhydrous product of solution 8 and a mixture of borax and boric acid was next prepared. The solution contained approximately 400 grams of solution 8; approximately 51.5 grams of sodium tetra borate; approximately 51.5 grams of boric acid; and approximately 1,717 grams of water. This solution was prepared by first mixing solution 8 and water together in an approximately 2,000 milliliter flask. The borax and boric acid were later added with agitation to the flask. Agitation was continued for approximately 30 minutes until the borax and boric acid was dissolved thereby forming a solution representing the preferred embodiment of this invention and hereinafter denoted as solution 11.

In a second embodiment, the pH of solution 11 is finally adjusted to about 4.75 to about 5.25 with NaOH.

Several set of cribs were treated with each of the aforementioned solutions using the well known vacuum process. Chemical loadings of 6%, 12% and 15% by weight were obtained. These cribs were tested relative to the method specified in the ASTM-E160 testing procedure. At the same time samples were treated to the same loading for hygroscopicity and corrosion tests as specified in the MIL 19140-E standards. These test results are summarized in Table 2. Corrosion and hygroscopicity results are the average of three replications of each sample.

The results of these tests generally indicate that solution 11. representing the preferred embodiment of this invention and containing urea; phosphoric acid; water; borax; boric acid; and sodium hydroxide is relative non-corrosive and non-hygroscopic.

TABLE 2

| | CORROSION (MILS/YR) | | | EMC | Crib Test | | |
|---|---|---|---|---|---|---|---|
| | Steel | Brass | Aluminum | % Wt. Inc. | 6% | 12% | 15% |
| Sol. 1 | 35 | 75 | 25 | 52.0% | 86.4% | 91.2% | 89.3% |
| Sol. 2 | 9 | 21 | 10 | 37.0% | 63.2% | 38.6% | 25.1% |
| Sol. 3 | 5 | 16 | 2 | 24.5% | 42.4% | 27.0% | 22.8% |
| Sol. 4 | 10 | 5.9 | 20 | 27.9% | 42.4% | 29.4% | 22.7% |
| Sol. 5 | 45 | 5 | 35 | 48.9% | 36.1% | 27.1% | 26.3% |
| Sol. 6 | 8.9 mpy | 2.65 mpy | 2.20 mpy | 22.4% | 41.0% | 26.7% | 21.0% |
| Sol. 7 | 9.9 mpy | 3.95 mpy | 4.00 mpy | 26.7% | 43.0% | 27.5% | 22.9% |
| Sol. 8 | | | | | | | |
| Sol. 9 | 9.0 mpy | 7.90 mpy | 4.10 mpy | 24.0% | 45.0% | 28.0% | 23.0% |
| Sol. 10 | 9.1 mpy | 8.10 mpy | 6.70 mpy | 23.7% | 40.9% | 26.5% | 20.9% |
| Sol. 11 | 17.5 mpy | 9.45 mpy | 8.10 mpy | 25.0% | 39.9% | 26.0% | 20.2% |

Substantially similar results may be obtained when the pH of the composition of Solution 11 is adjusted to about 4.75 to about 5.25 with NaOH. Such a solution additionally demonstrates improved shelf life and treated wood demonstrates resistance to loss of strength and degradation when exposed to high heat and humidity.

EXAMPLE 2

Several sheets of 15/32 CC Southern Yellow Pine Exterior Plywood were selected and cut into three sections wherein each section measured approximately 48×32 inches. The pieces were marked and coded for future reference. Two of the sections were impregnated with solution 11 representing the preferred embodiment of this invention, using a standard treating process. The treated and untreated sections were ripped into specimens wherein each specimen measured approximately 2×32 inches. End matched specimens of treated and untreated controls were conditioned for periods of 30 and 60 days at the approximate temperatures shown in Table 3, with relative humidity conditions adjusted in order to achieve a nominal equilibrium moisture content of approximately 12%. After conditioning, the specimens were subjected to testing specified by Method A of the ASTM D3043 procedure. The results of these tests are shown in Table 3 and represent ratios of the treated to untreated values at each temperature and time period of the respective properties.

Further, substantially similar results may be obtained when the pH of the composition of Solution 11 is adjusted to about 4.75 to about 5.25 with NaOH. Such a solution additionally demonstrates improved shelf life and treated wood demonstrates resistance to loss of strength and degradation when exposed to high heat and humidity.

TABLE 3

| | PROPERTY: | | | | | |
|---|---|---|---|---|---|---|
| | OE | | MOR | | STIFFNESS | |
| TEMPERATURE | TIME: (No. of days) | | | | | |
| CONDITION: | 30 | 60 | 30 | 60 | 30 | 60 |
| 170° F. | .95 | .89 | .78 | .66 | 1.00 | .96 |
| 150° F. | .95 | .87 | .84 | .77 | 1.00 | .95 |
| 75° F. | .94 | .86 | .87 | .87 | 1.00 | .97 |

EXAMPLE 3

Several commercial lumber species measuring approximately 2×6 inches were treated by pressure impregnation. The specimens were generally placed within a treating cylinder designed for vacuum and pressure impregnation. An initial vacuum of approximately 25 inches of mercury was drawn and held for approximately 30 minutes. An approximately 13.6% treating solution as described in the formulation of solution 11 representing the preferred embodiment of this invention was introduced into the cylinder while still under vacuum. When the cylinder was approximately full of treating solution hydrostatic pressure was applied at a level of approximately 150 psi for approximately 60 minutes. The cylinder was drained and a final vacuum of approximately 25 inches of mercury was drawn and held for approximately 15 minutes. The specimens were removed from the cylinder and placed in a conventional lumber dry kiln. The lumber was dried over a 3 day period by methods well known to the art. The samples were then combined into panels wherein each panel measured approximately 2×8 feet. These panels were tested in accordance with procedures specified in the ASTM E-84 methodology. The results are shown in Table 4. Also shown are results for plywood which was treated and tested in a like manner.

TABLE 4

PLYWOOD
Southern Yellow Pine
Douglas Fir
Lauans
Flamespread generated for the above were less than 25. No significant increase in combustibility was observed when the test duration was extended to 30 minutes.
LUMBER
Southern Yellow Pine
Ponderosa Pine
Douglas Fir
Hem Fir
SPF
Western Hemlock
Amabilis Fir
White Spruce
Engleman Spruce
Black Spruce
Red Spruce
Alpine Fir
Balsam Fir Flamespread generated for the above were less than 25. No significant increase in combustibility was observed when the test duration was extended to 30 minutes.

Although a limited number of embodiments of this invention have been illustrated in the accompanying examples and described in the foregoing details of the description it will be understood that the invention is not limited to the embodiment disclosed, but is capable of numerous rearrangements, modifications and substitutions without departing from the scope of the subjoined claims within the aforementioned invention.

What is claimed is:

1. A substantially formaldehyde-free flame retardant composition for wood having reduced corrosive properties and having a pH of between 4.75 and 5.25 consisting essentially of from about 28% to about 38% by weight of an amide selected from the group consisting of urea, dicyanidiamide and combinations thereof; from about 22% to about 32% by weight of an oxy-acid of phosphorus; from about 10.5% to about 20.5% by weight of a metal salt of boron; from about 10.5% to about 20.5% by weight of an oxy-acid of boron; and sodium hydroxide.

2. The flame retardant composition of claim 1, wherein the amide comprises urea.

3. The flame retardant composition of claim 1, wherein the oxy-acid of phosphorus comprises phosphoric acid.

4. The flame retardant composition of claim 1, wherein the metal salt of boron comprises borax.

5. The flame retardant composition of claim 1, wherein the oxy-acid of boron comprises boric acid.

6. The flame retardant composition of claim 1, wherein said composition is a water based mixture and said sodium hydroxide is present form about 6.5% to about 10.5% by weight.

7. A method of imparting flame retardance to a cellulose-containing substrate comprising treating said substrate with a composition according to claim 1.

8. A substantially formaldehyde-free flame retardant composition for wood having reduced corrosive properties and having a pH of between approximately 4.75 to 5.25 consisting essentially of from about 28% to about 38% by weight of an urea; from about 22% to about 32% by weight of an oxy-acid of phosphorus; from about 10.5% to about 20.5% by weight of borax; from about 10.5% to about 20.5% by weight of an oxy-acid of boron; and sodium hydroxide.

9. The flame retardant composition of claim 8, wherein said oxy-acid of phosphorus comprises phosphoric acid.

10. The flame retardant composition of claim 8, wherein said oxy-acid of boron comprises boric acid.

11. The flame retardant composition of claim 8, wherein said composition comprises:
a water based mixture containing from about 28% to about 38% by weight of said urea; from about 22% to about 32% by weight of said oxy-acid of phosphorus; from about 10.5% to about 20.5% by weight of said borax; from about 10.5% to about 20.5% by weight of said oxy-acid of boron; and from about 6.5% to about 10.5% by weight of sodium hydroxide.

12. The flame retardant composition of claim 8, wherein said oxy-acid of phosphorus comprises phosphoric acid.

13. The flame retardant of claim 8, wherein said oxy-acid of boron comprises boric acid.

14. A method of treating wood to impart fire resistance thereto, said method comprising:
impregnating said wood with an aqueous solution having a pH of between approximately 4.75 and 5.25, said solution consisting essentially of from about 28% to about 38% by weight of an amide selected from the group consisting of urea, dicyanidiamide and combinations thereof; from about 22% to about 32% by weight of an oxy-acid of phosphorus; from about 10.5% to about 20.5% by weight of a metal salt of boron; from about 10.5% to about 20.5% of an oxy-acid of boron; and sodium hydroxide.

15. A method of treating wood to impart fire resistance thereto, said method comprising:
impregnating said wood with a water based mixture having a pH of between approximately 4.75 and 5.25 consisting essentially of about 28% to about 38% to an amide selected from the group consisting of urea, dicyanidiamide and combinations thereof from about 22% to about 32% of an oxy-acid of phosphorus; from about 10.5% to about 20.5% of a metal salt of boron; from about 10.5% to about 20.5% of an oxy-acid of boron; and from about 6.5% to about 10.5% sodium hydroxide.

16. A method of treating wood to impart fire resistance thereto, said method comprising:
impregnating said wood with a solution having a pH of between approximately 4.75 and 5.25 consisting essentially of from about 28% to about 38% by weight of an urea; from about 22% to about 32% by weight of an oxy-acid of phosphorus; from about 10.5% to about 20.5% by weight of borax; from about 10.5% to about 20.5% by weight of an oxy-acid of boron; and sodium hydroxide.

17. A flame retardant composition having a pH between 4.75 and 5.25 prepared by:
forming a solution by admixing borax and boric acid with water;
forming a solution by admixing borax and boric acid with water;
mixing said formed solution with sodium hydroxide, urea and phosphoric acid; thereby forming said flame retardant composition, wherein said composition is substantially formaldehyde-free and said composition consisting essentially of:
about 32% by weight of said formed solution;
about 33% by weight of said urea;
about 27% by weight of said phosphoric acid; and
about 8% by weight of said sodium hydroxide.

18. A flame retardant composition for wood having reduced corrosive properties at a pH of between approximately 4.75 and 5.25 consisting essentially of from about 28% to about 38% by weight of an amide selected from the group consisting of urea, dicyanidiamide and combinations thereof; from about 22% to about 32% by weight of an oxy-acid of phosphorus; from about 10.5% to about 20.5% by weight of a metal salt of boron; and from about 10.5% to about 20.5% by weight of an oxy-acid of boron.

19. The flame retardant of claim 18 wherein the amide comprises urea.

20. The flame retardant of claim 18 wherein the oxy-acid of phosphorus comprises phosphoric acid.

21. The flame retardant composition of claim 18 wherein the metal salt of boron comprises borax.

22. The flame retardant composition of claim 18 wherein the oxy-acid of boron comprises boric acid.

23. A method of imparting flame retardance to a cellulose-containing substrate comprising treating said substrate with a composition according to claim 18.

24. An aqueous-based flame retardant composition consisting essentially of from about 28% to 38% of an amide; from about 22% to about 32% of an oxy-acid of phosphorus; from about 10.5% to about 20.5% of an oxy-acid of boron; and from about 6.5% to 10.5% sodium hydroxide.

25. The aqueous-based flame retardant composition according to claim 24, wherein the addition of sodium hydroxide serves to increase the pH to a desired level of between approximately 4.75 and 5.25.

26. A flame retardant composition for wood consisting essentially of from about 28% to about 38% by weight of an urea; from about 22% to about 32% by weight of an oxy-acid of phosphorus; from about 10.5% to about 20.5% by weight of borax; and from about 10.5% to about 20.5% by weight of an oxy-acid of boron.

27. An aqueous-based flame retardant composition consisting essentially of from about 28% to 38% of urea; from about 22% to about 32% of an oxy-acid of phosphorus; from about 10.5% to 20.5% of borax; from about 10.5% to about 20.5% of an oxy-acid of boron; and from about 6.5% to about 10.5% sodium hydroxide.

* * * * *

UNITED STATES PATENT AND TRADEMARK OFFICE
CERTIFICATE OF CORRECTION

PATENT NO. : 5,151,225

DATED : September 29, 1992

INVENTOR(S) : James F. Herndon, Dennis J. Morgan

It is certified that error appears in the above-identified patent and that said Letters Patent is hereby corrected as shown below:

In column 1, line 24, delete "sued" and insert --used--.

In column 1, line 61, delete "product" and insert --produced--.

In column 1, line 64, delete "pas" and insert --past--.

In column 3, line 6, delete "material" and insert --materials--.

In column 3, line 33, delete "be" and insert --by--.

In column 4, line 11, delete "of" and insert --or--.

In column 4, line 24, before "pH value" insert --a--.

In column 5, line 27, after "illustrate" delete "of".

In column 6, line 67, delete "relative" and insert --relatively--.

In column 7, Table 3, delete "OE" and insert --MOE--.

In column 9, line 26, delete "form" and insert --from--.

UNITED STATES PATENT AND TRADEMARK OFFICE
CERTIFICATE OF CORRECTION

PATENT NO. : 5,151,225

DATED : September 29, 1992

INVENTOR(S) : James F. Herndon, et al

It is certified that error appears in the above-identified patent and that said Letters Patent is hereby corrected as shown below:

In column 10, Claim 17, delete the following third paragraph "forming a solution by admixing borax and boric acid with water".

Signed and Sealed this

Sixteenth Day of November, 1993

Attest:

BRUCE LEHMAN

Attesting Officer     Commissioner of Patents and Trademarks